United States Patent
Brinkman et al.

(10) Patent No.: US 6,712,131 B1
(45) Date of Patent: Mar. 30, 2004

(54) METHOD FOR PRODUCING AN EXCHANGER AND EXCHANGER

(75) Inventors: Hendrik Willem Brinkman, Nuenen (NL); Harrie Gorter, Eindhoven (NL); Rinse Alle Terpstra, Geldrop (NL); Johannes Coenradus Theodorus Van Der Heijde, Mierlo (NL); Joost Petrus Gerardus Maria Van Eijk, Berkel Enschot (NL); Godefridus Hendricus Maria Gubbels, Helmond (NL)

(73) Assignee: Nederlandse Organisatie Voor Toegepast - Natuurwetenschappelijk Onderzoek TNO, Delft (NL)

( * ) Notice: Subject to any disclaimer, the term of this patent is extended or adjusted under 35 U.S.C. 154(b) by 0 days.

(21) Appl. No.: 09/722,018

(22) Filed: Nov. 27, 2000

Related U.S. Application Data

(62) Division of application No. 09/266,776, filed on Mar. 12, 1999, now Pat. No. 6,174,490.

(30) Foreign Application Priority Data

Mar. 12, 1998 (EP) .............................................. 98200806

(51) Int. Cl.[7] .................................................. F28F 9/16
(52) U.S. Cl. ........................ 165/158; 165/905; 165/178
(58) Field of Search ................................ 165/158, 905, 165/178

(56) References Cited

U.S. PATENT DOCUMENTS

| 1,288,014 A | | 12/1918 | Jewell | |
|---|---|---|---|---|
| 2,506,244 A | | 5/1950 | Stopka | |
| 3,923,940 A | | 12/1975 | Hujii et al. | |
| 4,296,052 A | | 10/1981 | Anand et al. ................. | 264/25 |
| 4,449,575 A | * | 5/1984 | Laws et al. ................. | 165/158 |
| H263 H | * | 5/1987 | Piscitella .................... | 165/158 |
| 4,768,586 A | * | 9/1988 | Berneburg et al. .......... | 165/905 |
| 4,770,828 A | | 9/1988 | Rogier et al. | |
| 5,194,154 A | * | 3/1993 | Moyer et al. ............ | 210/510.1 |
| 5,238,057 A | * | 8/1993 | Schelter et al. ............. | 165/158 |
| 5,941,302 A | * | 8/1999 | Hattori et al. ............... | 165/905 |
| 6,006,824 A | * | 12/1999 | Hattori et al. ............... | 165/158 |
| 6,089,020 A | * | 7/2000 | Kawamura ................... | 165/905 |

FOREIGN PATENT DOCUMENTS

| EP | 0 093 612 | 11/1983 |
|---|---|---|
| EP | 0 165 478 | 12/1985 |
| EP | 0 794 403 | 9/1997 |
| JP | 57-166344 | 10/1982 |
| JP | 61-4509 | 1/1986 |

* cited by examiner

*Primary Examiner*—Leonard Leo
(74) *Attorney, Agent, or Firm*—Young & Thompson

(57) ABSTRACT

The exchanger is made from a number of tubes sealingly connected to a pipe plate which is further connected to an enclosure. The pipe plate is realized by positioning enclosure and tubes in a mould and pouring a ceramic slurry which is subsequently sintered.

11 Claims, 2 Drawing Sheets

METHOD FOR PRODUCING AN EXCHANGER AND EXCHANGER

CROSS-REFERENCE TO RELATED APPLICATIONS

This application is a division of application Ser. No. 09/266,776, filed Mar. 12, 1999 and now U.S. Pat. No. 6,174,490.

The present invention relates to a method for producing an exchanger comprising a number of hollow exchanger tubes.

BACKGROUND OF THE INVENTION

Such an exchanger can be a heat exchanger, a substance exchanger, or separator. More particular the invention relates to an exchanger to be used at elevated temperature. Because of the conditions of use, ceramic material to provide sufficient service life is used in the art. As example hollow fibre membrane tubes with small tube diameter are mentioned. At higher temperature levels polymer membranes are no longer usable. Advantages of ceramic membranes are high temperature resistivity, mechanical stability and normally those membranes are not sensitive to chemical attack in, for example, corrosive surroundings. An example for a method to produce a ceramic hollow fibre membrane allowing for high fluxes is disclosed in EP-0 693 961 A1.

In practical use only tubes are not sufficient. They have to be incorporated in a module to make practical use thereof. Generally, such a module comprises an enclosure and a pipe plate for receiving the ends of the hollow tubes as well as possibly further plates to distribute flows both in the hollow tubes and around those tubes.

Up till now it was technically not feasible to produce in an economical way pipe plates which could withstand relative high temperatures and in which also some mechanical loading is observed and which can be scaled up easily.

It has been shown that many gas separation processes can be conducted at high temperature with ceramic membranes. An example is the 'Knudsen' separation with gamma-$Al_2O_3$ membranes, separation of hydrogen from a mixture of gases with silica membranes (300–500° C.), isomer separation with zeolite membranes (±500° C. max.) and electrochemical separation of oxygen from air with mixed ionic-electronic conducting materials (800–1000° C.). These are only examples for which high temperature exchangers could be used, more in particular the hollow fibre membrane tubes. In order to scale-up these processes high temperature resistant membrane modules allowing for high fluxes have to become available for relative low prices. JP-A-61 004509 discloses a heat exchanger comprising a bundle of thin glass membrane tubes. Because at a relatively low temperature glass material will lose its strength and start yielding, the use of a heat exchanger made according to the Japanese patent application is restricted to a relatively low temperature. Furthermore, additional measures are necessary to complete the heat exchanger. The glass tubes are connected to the pipe plates by introducing them in a mixture of glass and ceramics. Through heating, a sintering and bonding step would occur. Glass will function as a binder. However, if a higher temperature use is desired, it is no longer possible to use glass as a binder.

SUMMARY OF THE INVENTION

The invention aims to provide a method for producing such a module, a pipe plate respectively for an exchanger to be used at elevated temperatures having sufficient strength and manufactured in such a way that it is economically feasible. Of course, there should be a perfect sealing between the tubes and the pipe plate.

The tubes to be used according to the invention can be the hollow fibre membranes as described above. However, it should be noted that for other applications hollow ceramic tubes (i.e. having a larger diameter) or metallic tubes can be used. With the casting method according to the invention good sealing properties between the pipe plate and the tubes have been observed, whilst even after repeated heating and cooling down of the exchanger no cracks occurred. The method as described is economical to realise and provides an exchanger in which the pipe plate is no longer the restricting component for the temperature at which the exchanger can be used.

According to the invention sintering is obtained by using a slurry of a ceramic and at least one solvent, pouring the slurry in a mould which is able to absorb the solvent, i.e. removes the solvent before actual heating at elevated temperature before sintering starts. Because of that, in a controlled way positioning of the ceramic material can be obtained without a negative effect of gas bubbles, which would form during heating of the solvent, rising through a pipe plate. By sintering the enclosure to the pipe plate a mechanically stable and gas-tight structure is obtained.

The present invention deals with an economically attractive way to join simultaneously a large number of hollow tubes, more specifially ceramic hollow fibre membranes, to a substance exchanger, more specifially a ceramic membrane module with which liquid separation, gas permeation, gas separation and related processes at high temperature can be conducted. Furthermore, the invention is of importance at high-temperature heat exchanging processes and high-temperature ceramic or inorganic equipment in which leak-free ceramic/ceramic connections are required.

If the exchanger tubes are hollow fibre membranes, such ceramic membranes are first made as tubes or hollow fibres in the shape and condition in which they will be in the completed exchanger. This means that the desired pore size and porosity are already adjusted which can be effected by a heat treatment at elevated temperature, for example as described in EP- 0 693 961 (between 1200 and 1650° C.). Ceramic membranes can be porous or (inert) gas tight and can comprise one or more (concentric) layers.

To obtain a possibility of introducing a fluid around the pipes, according to a preferred embodiment of the invention, there is also arranged a feed/discharge pipe in the pipe plate. To provide sealing, it is possible to provide a feed/discharge pipe while casting the slurry in a mould in, or onto which the exchanger tubes are positioned. However, it will be understood that such feed/discharge pipes can also be connected to any other part of the enclosure.

The enclosure according to the invention can comprise a ceramic material and can have any shape known in the art. Preferably, it is also placed on, or in the mould to provide sealing engagement between the pipe plate and the enclosure.

In order to realize a plenum for the hollow tubes an end plate has to be provided spaced from the pipe plate. Such an end plate can be produced with the same method as described above for preparing the pipe plate. Dependent from the slurry and its condition used for the pipe plate, it is possible that this cast and dried slurry for the pipe plate is still in green condition whilst the end plate is cast so that both the end plate and the pipe plate can be sintered in one step. Of course production in two sintering steps is possible.

The other end of the exchanger can be produced in the same way and also for this production either separate sintering steps can be used or one general sintering step. In the last case the green strength of the other—opposed—pipe plate will be sufficient to allow handling of the exchanger to be built. Because the ceramic material resulting from the slurry after sintering has about the same thermal expansion coefficient as other components used in the exchanger (difference less than $5 \times 10^{-6} K^{-1}$), thermal tensions in the exchanger are minimized. Also mechanical properties are sufficient either at high temperature and extreme process pressures. For the ceramic material used in the exchanger, use can be made of aluminum oxide, silicon carbide, silicon nitride, zirconium oxide, hydroxyapatite, perovskites and other substances.

In all these cases, the composition of the ceramic slurry is chosen in such a way that after casting, minimum shrinkage occurs during drying and sintering.

As described above, the hollow tubes used can be in finished condition at the moment the pipe plates are cast around them. However, it is also possible to subject the internals of the heat exchangers to a further conditioning before or after sintering. To that end a liquid or vapour can be entered in the related compartment which can provide a coating having the desired properties. It is also possible to introduce two separate liquids or vapours in the two exchanging compartments which will diffuse into each other and react only at their interface in order to obtain the desired properties. In case that the pipe plates and end plates are not gas-tight yet, it may be desirable to apply a gas-tight, leak-free coating on these plates. In this case the ceramic compact gives mechanical strength whereas the coating is responsible for gas-tightness. The components for obtaining coatings or further treating the material of the exchange components can be introduced as sol-gel layer and after filling the related compartments excess material is drained. It is also possible to condition only determined parts of a compartment by appropriate positioning of the related part of the exchanger at introduction of the material to be applied on the related component.

The invention also relates to an exchanger. Surprisingly it has been found that no further sealing is necessary under ordinary conditions to provide a sufficient type fit between the tubes and the pipe plate.

EP 0 093 612 a1 discloses a heat exchanger without enclosure wherein the tube ends are received in spaced apertured pipe plates. The area between two adjacent pipe plates is filled with a ceramic slurry and hardened. This means that a product after hardening is not self-supporting. EP 0 165 478 A1 shows a substance exchanger wherein the exchanger tubes are of cellulose material which are placed in a polyurethane end plate. This is a low temperature exchanger. EP 0 794 403 A2 shows a heat exchanger having tubes extending from one pipe plate in which further tubes are introduced. There is no opposite side plate and no enclosure extending between said pipe plate. The enclosure of the exchanger according to the invention can be both a ceramic and metallic material. If a metallic material is used, it should also have a coefficient of expansion approaching the coefficient of expansion of the ceramic material as indicated above. An example of a metallic material which can be used is a Fe—Ni—Co alloy known as VACON or DILVER P.

However, if further sealing is necessary, for example if relatively porous ceramic materials are used, the coating process as described above be applied.

BRIEF DESCRIPTION OF THE DRAWINGS

The invention will be further elucidated referring to an example shown in the drawings wherein.

DETAILED DESCRIPTION OF THE INVENTION

Figure 1:
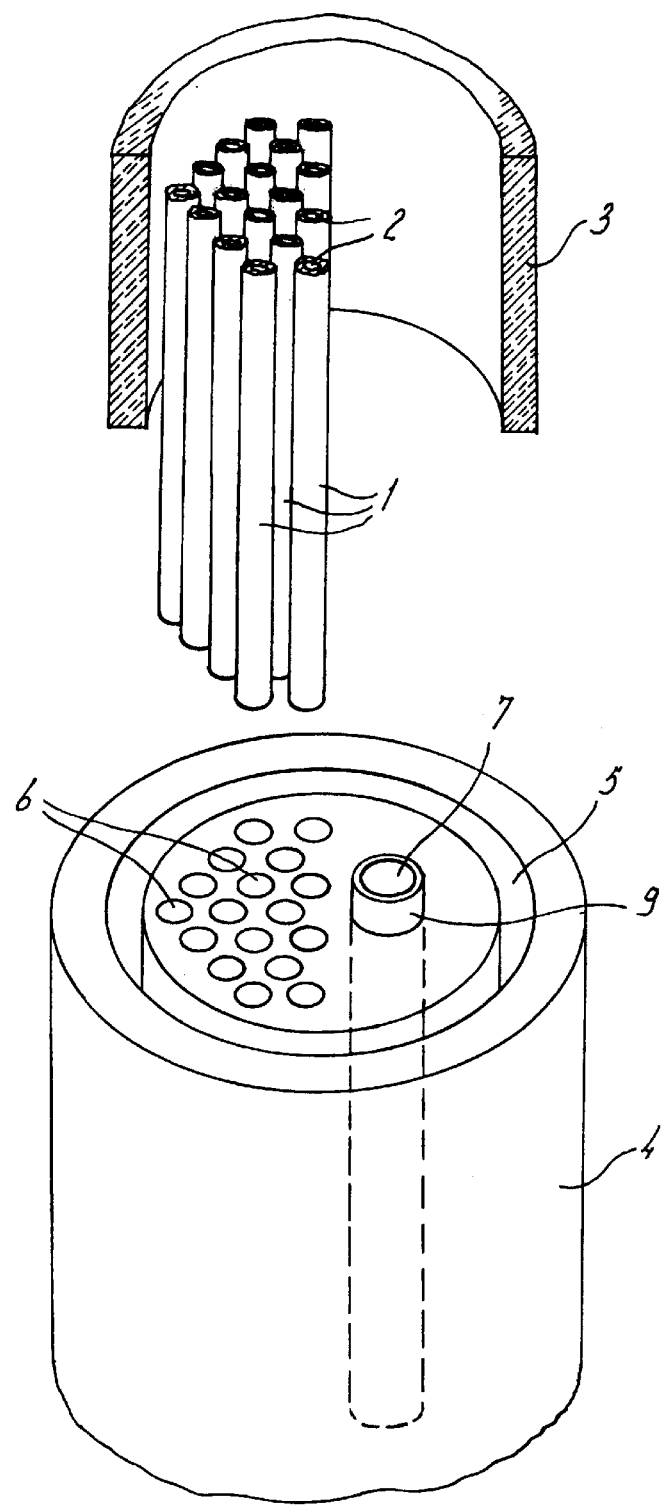
FIG. 1 schematically shows some of the components to be used to obtain an exchanger according to the invention.

In FIG. 1 the hollow tubes on which exchanging/separating is effected are indicated by 1. This can be a ceramic material or metallic material. In a chosen example tubes of ceramic material are used having an external diameter below 2.5 mm and because of that are referred to by hollow fibre membrane tubes. Such tubes are used, for example for separating substances at elevated temperature. However, as indicated above many other applications for the exchanger according to the invention are possible.

The opening in the tubes 1 is indicated by 2. 3 is an enclosure positioned around the tubes. 4 is a mould to be used to provide a pipe plate. This mould comprises a circular groove 5 arranged to accommodate the free end of enclosure 3. Dead ending openings 6 are provided in mould to receive tubes 1. A relatively larger passage 7 is present in which feed/discharge pipe 9 can be introduced. The mould can be realized from any material known in the art but in this example gypsum is used. Both the enclosure 3 and the feed/discharge pipe 9 are made from a ceramic material.

Figure 2:
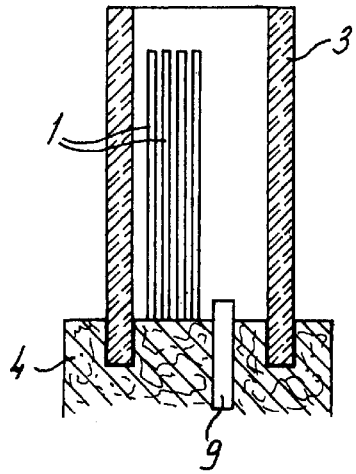
FIG. 2–6 show several steps for the production of the exchanger.
Figure 3:
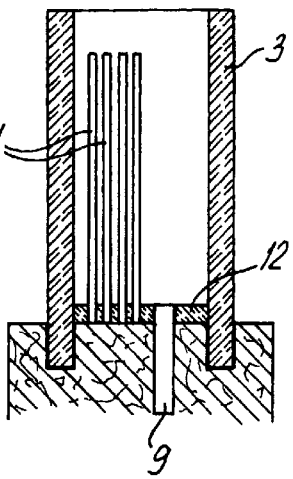

To obtain a pipe plate first of all several items are positioned in or onto mould 4 as shown in FIG. 2. Subsequently a slurry is cast from above in enclosure 3 to obtain a layer of slurry material having the shape of the pipe plate 12 to be produced. Mould 4 is a relatively porous material being able to absorb the solvent of the slurry so that drying thereof is a relatively simple step. After this slurry is introduced the mould is removed. This is only possible if the green strength of the slurry material is sufficient to keep several components together.

Figure 4:
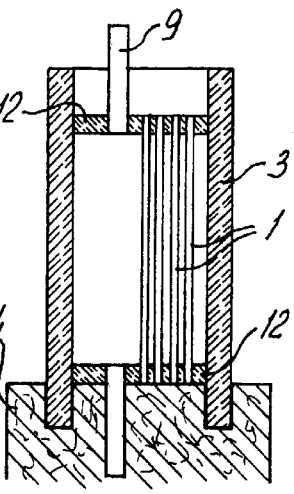

FIG. 4 shows the next step in which the pipe plate on the opposite side of exchanger to be built is shown.

Figure 5:
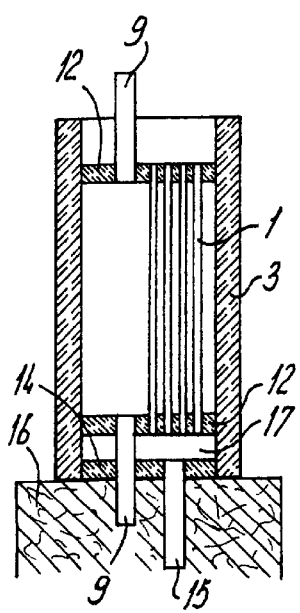
Figure 6:
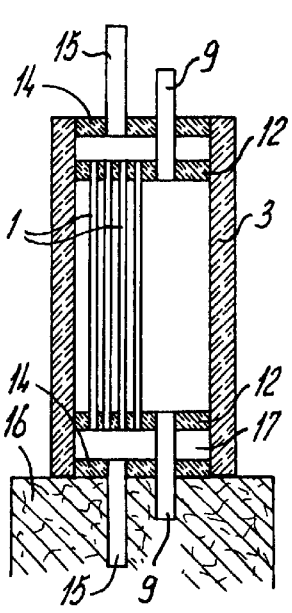
Figure 7:
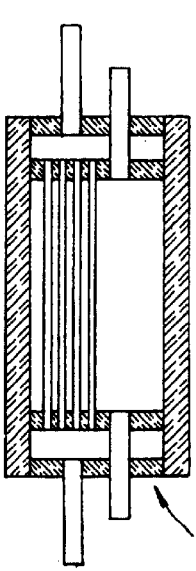
FIG. 7 shows an exchanger according to the invention.

The next step whether or not after sintering is to provide the end plate 14 to delimit the plenum 17 for the tubes. This is shown in FIG. 5 wherein the pipe plate produced is indicated by the reference number 12 and the further mould used has reference number 16. In this mould except from the feed/discharge pipe 9, there is also arranged a feed/discharge pipe 15 made from a ceramic material in order to connect the tubes with the surroundings. Slurry material can be introduced through such pipe 15 up to the top level thereof. After that and making the opposite plate 14 (FIG. 6) sintering is effected and the heat exchanger generally referred to by 10 as shown in FIG. 7 is obtained. Sintering can be effected by heating during about 2 hours at about 1200° C. However, it should be noted that depending upon the materials used, other sintering conditions, which will be obvious to the persons skilled in the art, are applicable.

In a next step, coatings can be introduced by flowing a fluid through the exchanger which fluid will be deposited on the related surfaces of the components of the exchanger and provide a more or less gas tight surface. It is possible to apply such coatings on the pipe plates or end plates after producing these plates one at the time.

Figure 8:
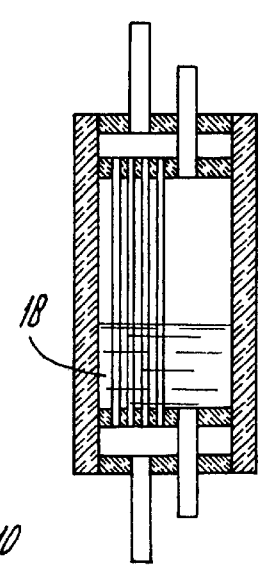
FIG. 8 shows an additional treatment of the exchanger according to the invention.

An example of a further treatment is shown in FIG. 8. Through pipe 9 a sol-gel material is introduced. After filling exchanger compartment 18 above plenum 17, pressure is removed from pipe 9 and excess slurry is allowed to drain back.

If immediately after manufacturing or after prolonged use leaks appear, it is possible to repair such leaks through vapour face deposition or infiltration technique (CVD or CVI) through reactants approaching each other from opposite sides of the leak. These reagents in gas or vapour conditions are introduced through the related feed/discharge pipe. Furthermore, it is possible to repair remaining leaks by wet chemical deposition technique through reagents approaching each other from opposite sides of the leaks.

EXAMPLE

Below follows a description for producing a ceramic membrane module for a membrane system comprising an extruded alpha-$Al_2O_3$ support having a gamma-$Al_2O_3$ top layer.

Through the extrusion technique and the subsequent heat treatment at 1250° C. a number of alpha-$Al_2O_3$ hollow fibre membranes have been prepared having an outer diameter of 2 mm, a length of about 20 cm and an average pore size of 0.2 $\mu$m and a porosity of about 40%. Before use within the exchange according to the invention, the tubes are cut to a length of 117 mm. As enclosure 3 a commercial obtainable sealed $Al_2O_3$ tube is used (Alsint, having Hat less than 0.3 vol % open space sold by Ceratec, The Netherlands) having a length of 200 mm, an inner diameter of 40 mm and an outer diameter of 50 mm. Four feed discharge pipes 9 are made from the same material having a length of 100 mm and an inner diameter of 4 mm and an outer diameter of 6 mm.

The gypsum block 4 is machined through drilling and grinding so that the enclosure 3, a teed pipe 9 and twenty hollow fibre membranes 1 can be vertically positioned thereon. The enclosure 3 extends 2.0 cm in mould 4, and the hollow fibre membranes 1 extend several millimeters in the mould. The feed/discharge pipe 9 completely penetrates the gypsum block. Both the feed/discharge pipe and the membranes are positioned inside the enclosure. The tubes all have the same height at their extremity. A ceramic slurry is prepared having the following composition:

1260.2 grams $Al_2O_3$ (T60 of Alcoa),
988.2 grams $Al_2O_3$ slurry (85 wt % A17NE-slurry of Alcoa),
84.1 grams demiwater and
1.0 grams Dolapix CE 64.

The ceramic slurry contains 90% by weight $Al_2O_3$. About 35 grams ceramic slurry was cast in the enclosure around the ceramic tubes 1 and the feed/discharge pipe 9. After a drying time of about 1 hour the combination slurry/enclosure/membranes/feed discharge pipe is removed from the gypsum block and was further dried overnight. The next day, this combination is subjected to a heat treatment in air at the temperature of 1200° C. during 2 hours having a heating and cooling rate of 240° C./hr, further called 'standardized heat treatment'. Due to the high solid content (90% by weight $Al_2O_3$) of the slurry, hardly any shrinkage was observed during drying and sintering. Above the slurry cast ceramic compact, i.e. 'connection' a coating is provided based on aluminum oxide. This coating is prepared by mixing aluminum oxide based frit powder type PE-FG-01 (obtainable at PRINTLAS EUROPE) with water and to brush the resultant product on the 'connection'. The coating is cured through the 'standardized heat treatment'. The sealing properties of the connection as such (i.e. slurry cast ceramic compact and its coating) was tested. Air leaking values in the order of $10^{-10}$ mol/$m^2$.s.Pa (tested between 0 and 1 bar) were measured. Except from the commercial aluminum oxide based frit powder some tests were conducted with a glass mixture (70 wt % $SiO_2$ 10% $Na_2O$, 9% CaO, 6% $Al_2O_3$), mixed with water and also brushed and subjected to a 'standardized heat treatment'. Also the sealing properties of this connection as such is around $10^{-10}$ mol/$m^2$.s.Pa. As comparative value- .silica based $H_2$ separation membranes have a permeation of around $10^{-7}$ mol/$m^2$.s.Pa (see for example A. J. Burggraaf, L. Cot, "Fundamentals of inorganic membrane science and technology", Elsevier, Amsterdam (1996), Chapter 9).

In a subsequent step above 'combination' is reversed on a gypsum block in which the second feed/discharge tube 9 is positioned. The ceramic membranes are all exactly on the upper face of the mould 4. The enclosure slides exactly around the upper face of mould 4. Again 35 grams ceramic slurry with the composition as mentioned above is cast through the discharge pipe 9, which has already been connected to the first pipe plate. After one hour drying, the second pipe plate is removed from the mould, dried over night and subjected to the standardized heat treatment. Also this second connection is coated with a coating based on frit powder PE-FG-01 and subjected to the 'standardized heat treatment'.

The third connection, .i.e. realisation of the end plate is effected by placing the article produced up till now on a flat mould 16 through which a further feed discharge 10 extends. 35 gr ceramic slurry having the above composition is fed from below to above and flows around the related feed/discharge pipe inside the enclosure. After drying, removal from the mould and standardized heat treatment, this end plate is also sealed with the coating as described above. The second end plate is realized in the same way.

Now a membrane module based on alpha-$Al_2O_3$ hollow fibre membranes having an outer diameter of about 2 mm an average pore diameter of 0.2 $\mu$m and a porosity of 40% is finished.

Provision of a gamma-$Al_2O_3$ top layer on the exterior of the hollow alpha-$Al_2O_3$ tube membranes is effected by preparing a boehmite sol as described by H. W. Brinkman, 'Ceramic membranes by (electro)chemical vapour deposition' thesis University of Twente (1994), page 25. The exchanger is vertically positioned and the lower feed/discharge pipes 9 are closed. Through upper feed/discharge pipe 9, the boehmite-sol is cast until compartment 18 is completely filled with sol. After about 30 seconds the lower feed/discharge pipes are opened so that the excess sol can flow away. The remaining sol applied to the hollow fibre membranes is dried overnight in the air and converted to gamma-$Al_2O_3$ top layer through a heat treatment in air at 450° C. during 3 hours having a heating and cooling rate of 1.5° C. per minute. The exchanger is now ready for use.

Although the invention has been described above referring to a preferred example it should be understood that many changes can be made which are obvious for the person skilled in the art after reading the above description and within the scope of protection of the appended claims.

What is claimed is:
1. An exchanger comprising:
    a tubular enclosure with an inner surface, a first open end and a second open end;
    a first ceramic pipe plate being positioned near the first open end, having a perimeter sintered directly to the inner surface of the enclosure and being provided with a number of bores each having an inner surface;

a second ceramic pipe plate being positioned near the second open end, having a perimeter sintered directly to said inner surface of the enclosure and being provided with a number of bores each having an inner surface;

a number of exchanger tubes, each tube having an outer surface, a first end and a second end, the outer surface of the first end of each tube being directly sintered to the inner surface of one of the bores in the first ceramic pipe plate and the outer surface of the second end of each tube being directly sintered to the inner surface of one of the bores in the second ceramic pipe plate, the number of bores in the first pipe plate as well as the number of bores in the second pipe plate being equal to the number of exchanger tubes;

at least one pipe opening into an inner space between the first pipe plate, the second pipe plate and the enclosure; and wherein the first pipe plate is spaced from the first open end and further comprising:

a first ceramic end plate sintered directly to the inner surface of the enclosure for closing the first open end; and at least one pipe opening into a first plenum between the first end plate, the first pipe plate and the enclosure.

2. The exchanger according to claim 1, wherein the pipe opening into the first plenum extends through the first end plate and is directly sintered to the first end plate.

3. The exchanger according to claim 2, wherein the pipe opening into the inner space extends through the first end plate and the first pipe plate and is directly sintered to the first end plate and the first pipe plate.

4. The exchanger according to claim 1, wherein the pipe opening into the inner space extends through the first end plate and the first pipe plate and is directly sintered to the first end plate and the first pipe plate.

5. The exchanger according to claim 1, wherein the second pipe plate is spaced from the open end and further comprising:

a second ceramic end plate sintered directly to the inner surface of the enclosure for closing the second open end; and at least one pipe opening into a second plenum between the second end plate, the second pipe plate and the enclosure.

6. The exchanger according to claim 5, wherein the pipe opening into the second plenum extends through the second end plate and is directly sintered to the second end plate.

7. The exchanger according to claim 6, wherein the pipe opening into the inner space extends through the second end plate and the second pipe plate and is directly sintered to the second end plate and the second pipe plate.

8. The exchanger according to claim 5, wherein the pipe opening into the inner space extends through the second end plate and the second pipe plate and is directly sintered to the second end plate and the second pipe plate.

9. The exchanger according to claim 1, wherein the enclosure comprises a metallic or ceramic material.

10. The exchanger according to claim 1, wherein the exchanger tubes consist of hollow fiber tubes.

11. The exchanger according to claim 1, wherein the enclosure is provided with a ceramic glass coating.

* * * * *